3,466,597
LOGGING WHILE DRILLING SYSTEM
Albert P. Richter, Jr., and James D. Bruner, Houston, Tex., assignors to Texaco Inc., New York, N.Y., a corporation of Delaware
Filed Oct. 10, 1967, Ser. No. 674,335
Int. Cl. G01v 1/40
U.S. Cl. 340—18                      1 Claim

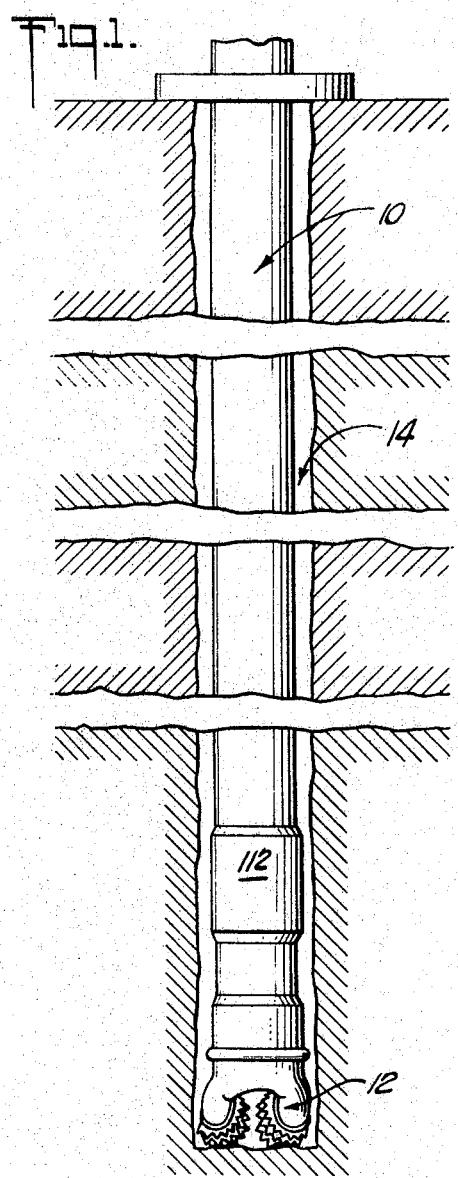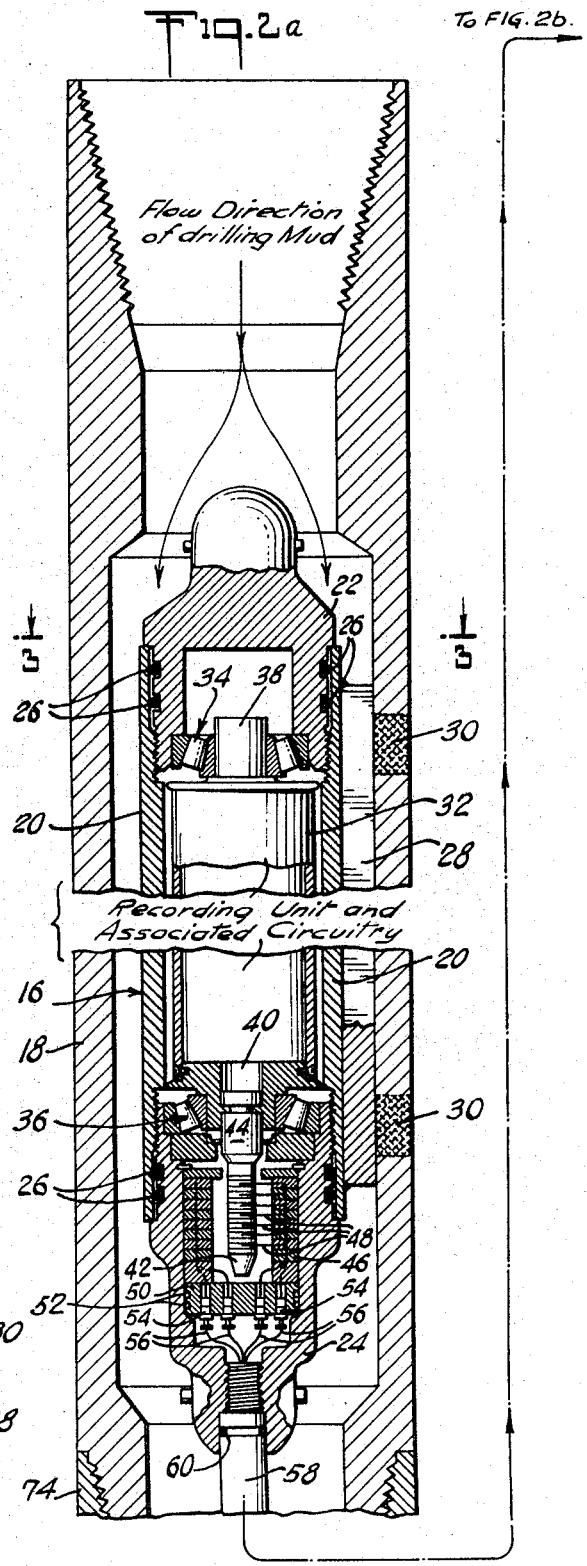

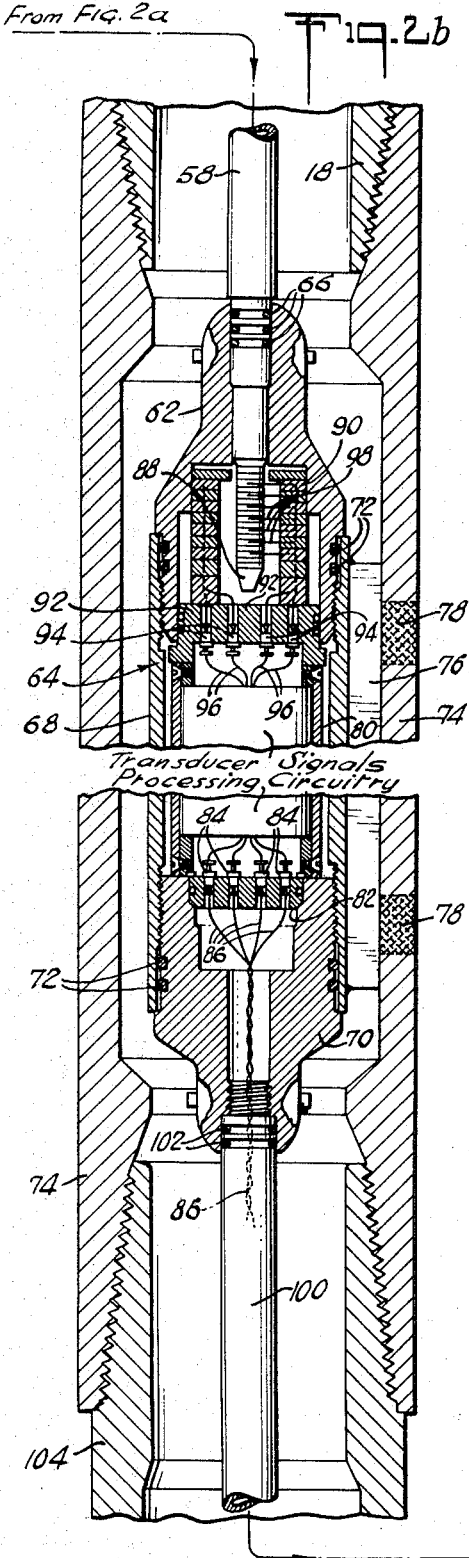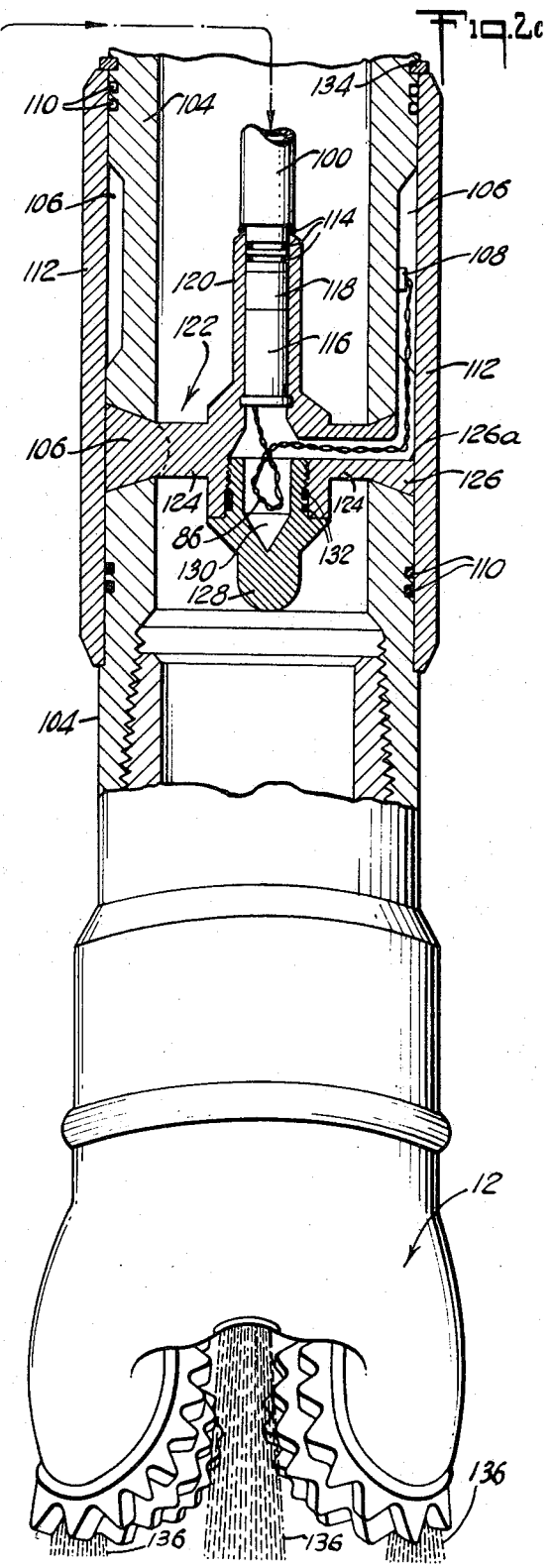

ABSTRACT OF THE DISCLOSURE

Apparatus for logging a borehole in the earth while the borehole is being drilled; said apparatus being incorporated in a drill string and including a special sub located above and in close proximity to a rotary drill bit. The special sub houses at least one transducer for providing signals representative of at least one parameter determined in the borehole. Two additional subs are serially coupled end-to-end with each other and with the special sub to form a configuration of three longitudinally aligned subs, the special sub nearest the drill bit being the lowermost one. Supported coaxially within the two upper additional subs are two sealed capsules, or containers, which are longitudinally spaced apart. One capsule houses, among other things, a recording unit, a power supply and associated circuitry while the other capsule houses a power supply and circuitry for processing signals from the transducer or transducers. Two conduits are provided: one providing communication between the two capsules and the other providing communication between the transducer in the special sub and the capsule containing the circuitry for processing the transducer signals. The conduits are of such construction as to permit the quick separation of the capsules and the connections to the transducer element or elements. Each of the sealed capsules is supported coaxially within their serially coupled additional subs by multiple longitudinal runners which are welded to the outside surface of the capsules and to the wall of the special subs.

Background of the invention

This invention pertains, in general, to apparatus for logging an earth borehole simultaneously with the drilling of the borehole for geophysical prospecting purposes; and, more particularly, to borehole logging apparatus including a recording instrument which is incorporated in a drill string near a drill bit whereby various borehole parameters, including those related to the drilling operation per se, can be detected and measured as well as recorded in situ, in the borehole, without the necessity of transmitting signals representative of the various parameters from the depths of the borehole to the surface of the earth.

Often, while seeking sub-surface oil, gas, or minerals and the drilling of an earth bore hole is in progress it is necessary to both obtain and record measurements of various parameters in situ; i.e., the detection measurement and recording are all done downhole in the borehole while the drilling is in progress. For example, the following measurements among others have been found to be very useful: drilling mud pressures; mud weight; vibration; weight on the drill bit; drill bit torque; stresses and strains on the drill pipe and drill bit; borehole deviation; various parameters relating to the earth formations being penetrated by the drill bit such as, for example, electrical resistivity and spontaneous potential, temperatures; etc. Methods and apparatus for detecting, measuring and recording various parameters in situ, within the borehole, while the drill bit is rotating and penetrating the various earth formations are disclosed in, among others, the following United States patents: 3,149,683 issued Sept. 22, 1964, to R. J. Clements et al.; 3,134,069 issued May 19, 1964, to R. J. Clements et al.; issued Sept. 22, 1964, to R. J. Clements et al.; and 3,209,323 issued Sept. 28, 1965, to G. J. Grossman, Jr.

As the drill string and the drill bit rotate and penetrate the various earth formations the simultaneously functioning logging equipment located in the vicinity of the drill bit is subjected to vibrations. The rotary motion, among other motions, of the drill bit often subjects the logging equipment to violent shocks and impact forces. The logging equipment includes operationally sensitive elements or components which are relatively delicate, structurally, as compared with the massive drill pipe, drill collars, subs and drill bit. For example, the logging equipment may be comprised of: electric batteries or another electric power source; electrical and electronic circuitry including relays, slip ring assemblies, vacuum tubes, transistors, semiconductor diodes, or the like; various detectors, sensors, or transducers such as strain gages, piezoelectric crystals, or the like; electrodes, a recording instrument such as, for example, a magnetic tape recording unit; etc. Usually, the logging equipment comprising, among others, the foregoing elements or components are housed in a single rather long and massive sealed housing or capsule which can withstand very high pressures exerted thereon and which is secured coaxially within drill collars or special subs. The various logging elements or components are usually stacked in series vertically at different levels longitudinally within the interior of the single long sealed capsule. A support assembly comprising a series of spaced-apart vertically stacked plates or discs connected together by vertical support rods is used to support the various elements and components supported by it are housed within the sealed capsule. The elements or components are secured to the aforesaid support assembly and the support assembly is, in turn, secured to the inner wall of the single long sealed capsule. The lengthy sealed capsule containing all the logging equipment hereinbefore described is secured coaxially within a special sub, or serially coupled subs, above the drill bit by means of short bosses or studs which project radially outward from the outside wall surface of the capsule to the inner surface of the sub; the studs or bosses being welded to the capsule and to the special sub at the outside and inside wall surfaces thereof, respectively. The aforementioned studs or bosses are relatively short in length as compared with longitudinal dimension of the capsule and usually the capsule is supported by means of the studs on the special sub at only a few points along its own longitudinal dimension.

While the above described structural arrangement, or configuration, of the subs, single long capsule and logging equipment has proven to be both useful and practical, certain disadvantages have, nevertheless, been discovered in practice. The vibrations occasioned by the rotating drill bit have caused damage to the single long sealed capsule as well as to the logging equipment contained therein. For example, the vibrational and other forces have caused the long sealed capsule to crack due to fatigue failure at the welded bosses or studs. In addition, various elements or components of the logging equipment within the capsule have been damaged by the aforesaid forces. It was found that the use of a single capsule packed with all of the logging equipment does not stand up very well, structurally, to the aforementioned hostile forces encountered down in the borehole while drilling progresses. The single capsule is too long and too massive to withstand very well repeated shock and impact forces. Not only is the single capsule, packed with all of the logging equipment, difficult to fabricate and assemble but it has to be completely rebuilt every time different borehole parameters are to be measured. For example, different transducers and electronic circuitry for processing the transducer signals have to be substituted into the long capsule after other parameter detecting transducers and circuitry among other things, are removed when a different measurement is to be made. This is, of course, an expensive and time consuming task.

Summary of the invention

One object of the invention is to provide new and improved earth borehole logging apparatus which is better able to withstand the aforesaid hostile forces occasioned while drilling is in progress in order to thereby eliminate, or at least substantially minimize, damage to the logging apparatus including the various logging elements or components thereof.

Another object of the invention is to provide borehole logging apparatus which does not have to be completely rebuilt each time a different borehole parameter is to be detected, measured, and recorded.

Another object of the invention is to provide well logging apparatus which is relatively easy, as compared with prior art apparatus, to fabricate and assemble.

Another object of the invention is to provide borehole logging apparatus which, as compared with prior art apparatus, is easily and quickly maintained, repaired and reassembled as the need arises.

Another object of the invention is to provide borehole logging apparatus having improved means for arranging measuring transducers; the arrangement providing easy access to the transducers in the event that they need to be changed or replaced as well as to provide a maximum degree of protection for the transducers.

In accordance with the invention the subject borehole logging apparatus for geophysical prospecting is comprised of plurality of individual sealed capsules or pressure resistant containers in which many of the necessary logging elements or components are located. In addition, there is provided a separate housing for the parameter measuring transducer or transducers. Conduits interconnect the transducer housing with at least one of the sealed capsules and the capsules, in turn, are also interconnected via at least one conduit. The necessary electrical wiring between the capsules and the transducer housing is carried in the conduits. For example, in an illustrative, but not limitative, embodiment of the invention, hereinafter described and illustrated in the accompanying drawing figures, two sealed capsules are employed. One capsule contains, inter alia, electronic circuitry necessary for processing the transducer signals while the other capsule contains a magnetic recording unit, or other type recording unit, and associated circuitry, among other things. For convenience, the formerly mentioned capsule is, hereinafter, referred to as the transducer signal processing capsule and the latterly mentioned capsule is referred to as the recorder capsule. The two sealed capsules are longitudinally spaced apart, axially, and are coaxially supported within a plurality of subs which are coupled end-to-end. The end-to-end coupled subs are, in turn, coupled directly in the drill string near the drill bit. Drilling fluid, or mud as such fluid is commonly called, entering the hollow drill string passes between the outside surface of the capsules and the inside surfaces of the drill string and of the coupled subs. When exiting from the borehole the drilling fluid passes between the outside surface of the subs and string and the wall of the borehole. In order to electrically couple the transducer signal processing capsule with the recorder capsule there is provided a communication conduit which extends between adjacent ends of the two-spaced-apart sealed capsules. The necessary electrical wiring runs through this conduit from one capsule to the other. Advantageously, this conduit may be quickly disconnected from the transducer signal processing capsule in order that a different capsule containing different transducer signal processing circuitry may be quickly reconnected, if desired, to the same recorder capsule. This might be necessary when different transducers are employed for the purpose of making different measurements in the borehole. For the purpose of rigidly securing each of the capsules coaxially within the subs a plurality of elongated members, or runners are welded entirely along the outside surface of the capsules and at various places to the inside surface of the subs. Each longitudinal member, or runner, extends longitudinally along and between the capsule and drill sub for a substantial distance thereby rigidly securing the sealed capsules to its adjacent sub, along substantially its entire length. Mounted directly above the drill bit between the aforementioned subs and capsules is a shorter special sub or special drill collar. The outside of this special sub is provided with a recess or a cavity in which there is housed one or more transducers such as, for example, strain gages, accelerometers, pressure transducers, etc. A tubular member encompasses this special sub and covers the recess or cavity as well as the transducer or transducers mounted therein. O-ring seals are situated between the sub and the tubular member to protect the transducers which could easily be damaged if the drilling fluid would otherwise have access to the recess or cavity in the special sub and, thereby, "wash out" the transducers. Within the bore of the special sub there is situated another communication conduit which carries electrical wiring from the transducer, or transducers, to the transducer signal processing capsule. Advantageously, this communications conduit may be quickly disconnected from the special sub in the event that different transducers need to be placed in the recess of the special sub or in the event that a different special sub is to be used.

One feature of the present invention resides in the employment of a plurality of smaller sealed capsules or housings which are communicatively coupled by intermediate quickly disconnectable conduits. Since the individual capsules are less bulky and less massive than the formerly used long single capsule they can structually withstand the aforesaid downhole forces much better. Furthermore, by distributing the logging elements or components among these smaller less massive and less bulky individual capsules maintainence, repair, replacement or change of the various logging elements or components is achievable much more easily and in much less time than with the prior art single long capsule arrangement.

Another feature of the invention resides in the use of a plurality of elongated support members or runners extending longitudinally along each of the sealed capsules for a substantial distance and welded to the capsules and subs thereby providing a more positive rigid support of the capsules to the subs and lessening the possibility of fatigue fracturing hereinbefore encountered in the prior art single long capsule arrangement.

Another feature of the invention resides in the employment of quickly disconnectable conduits to permit the substitution of different capsules, transducers, or transducer housings as may be required in the logging operation.

Another feature of the invention resides in the use of a special sub which is so constructed that it is highly versatile in that a variety of different transducers may be mounted in said sub for the purpose of making a variety of downhole parameter measurements; the transducers being easily and quickly accessible from the outer surface of the special sub thereby making it relatively easy to change transducers as the need arises.

Other objects and advantages as well as the various features of novelty which characterize the invention are pointed out with particularity in the claim annexed hereto and forming part of this specification. For a clearer understanding of the invention, its operating advantages and the specific objects attained by its use reference should be had to the accompanying drawing figures and descriptive matter in which there is illustrated and described a preferred embodiment of the invention.

Brief description of the drawings

FIG. 1 is an elevation view showing a rotary drilling apparatus penetrating various earth formations during the drilling of an earth borehole; said apparatus including the logging apparatus in accordance with the present invention.

FIGS. 2a, 2b and 2c are cross sectional elevation views of different sections of the lower end of the drilling apparatus of FIG. 1 and including the rotary drill bit of the apparatus of FIG. 1; FIG. 2a showing the uppermost section, FIG. 2b the next lower section and FIG. 2c the lowermost section, below FIG. 2b.

FIG. 3 is a cross section view taken along the section line 3—3 of FIG. 2a.

Description of the preferred embodiment

Referring now to the drawing figures wherein like elements or components are designated by the same reference characters, in FIG. 1 there is shown a drill string 10 which is made up of, among other things, a series of drill pipes connected end-to-end. Located at the lowermost end of the drill string 10 is a conventional rotary drill bit, generally designated by the reference number, 12. As shown in FIG. 1, drill bit 12 has rotatably drilled an earth borehole 14 which traverses various earth formations.

Referring now to FIG. 2a there illustrated is the recorder capsule which is designated generally by the reference number 16. The capsule 16 is a sealed container adapted to withstand pressures of about 14,000 pounds per square inch, or more. As shown, recorder capsule 16 is situated coaxially within a special sub 18 which, in the illustration shown, is a drill collar which has been hollowed out for the purpose of receiving capsule 16.

As shown in FIG. 2a, recorder capsule 16 is comprised of a tubular member 20 of steel or another suitable high strength material. Tubular member 20 is, as illustrated, internally threaded near its upper end and near its lower end. As shown, the aforementioned internal threads are for the purpose of receiving external threads formed on the end caps 22 and 24, respectively. The end caps 22 and 24, or bull plugs as they are often called, close the upper and lower ends of tubular number 20. The end caps 22 and 24 each have two annular recesses formed in the outer surfaces thereof and these annular recesses each contain O-rings 26. The four O-rings 26 shown in FIG. 2a effectively seal the recorder capsule 16 so that the drilling fluid, or drilling mud, flowing through the special sub 18 in the direction indicated in FIG. 2a cannot enter the recorder capsule 16; the direction of drilling mud flow being indicated by the labeled arrow in FIG. 2a.

As indicated in FIGS. 2a and 3 the recorder capsule 16 is supported within the special sub 18 by means of three longitudinal members 28, or runners, which are welded to the outside surface of the tubular member 20 along substantially the entire length thereof. Runners 28 are also welded to the special sub 18. In order to weld runners 28 to the special sub 18 a plurality of holes are machined through the wall of the sub 18 and after the recorder capsule with the runners welded thereto has been positioned within the sub the weld is made through the sub 18 thereby securing the runners 28 to the wall of the sub 18. The aforesaid welds are designated by the reference numbers 30. As shown in FIG. 3 the runners 28 are spaced 120° apart. While three runners 28 are illustrated in the drawings it is to be understood that more than, or less than, three runners 28 may be employed. Advantageously, the longitudinal members 28, or runners as indicated in FIGS. 2a and 3 support the recorder capsule 16 within the special sub 18 along substantially the entire length of capsule 16. The runners 28 are welded along the entire length of the tubular member 20 of capsule 16.

Located within the tubular member 20 is a tubular container 32 or housing in which there is situated a recorder and associated circuitry, among other things.

The container 32 housing the recording unit and its associated circuitry is mounted for rotation about its own longitudinal axis by means of two sets of tapered roller bearings 34 and 36 located at the upper and lower ends, respectively, of the container 32. This arrangement is advantageous in that the recording unit and its associated circuitry within the container 32 can be free to rotate thus avoiding damage occasioned by sudden angular accelerations or decelerations of the rotating drill string and drill bit. The uppermost end of the container 32 is provided with an end cap having a cylindrical shaft 38 which, as shown, is journaled for rotation in the bearing member 34. The lower end of the container 32 is also provided with an end cap having a cylindrical shaft 40. The cylindrical shaft 40 is hollow and is adapted to receive the male portion 42 of a slip ring assembly, the male portion 42 having an enlarged cylindrical shaft portion 44 which, as indicated, is journaled for a rotation in the bearing member 36. The cylindrical portion 44 is rigidly connected to shaft 40 and shaft 40 is rigidly connected to the container 32 so that the container 32 may rotate about its longitudinal axis. The male portion 42 of the slip ring assembly is, of course, free to rotate in unison with the container 32 and shaft 40. The male portion 42 of the slip ring assembly has an internal cavity therein carrying wiring which communicates with the container 32 and the recording unit and associated circuitry therein. The slip ring assembly is also comprised of a female portion 46. Suffice it to say that wiring from the static or non-mobile female portion 46 is transferred electrically via electrical contacts 48 to the male or movable portion 42. Situated immediately below female portion 46 is a block 50 of dielectric material in cylindrical form which houses various terminals. As indicated, the cylindrical block 50 is provided with annular recesses containing O-rings 52. Also, as shown in FIG. 2a the cylindrical dielectric block 50 is provided with a plurality of terminal members 54. Connected to the various terminal members 54 are electrical conductors 56 which, in turn, electrically communicate, through the terminals 54, to the static or female portion 46, from whence they are connected to the electrical contacts 48 and thence to the male portion 42 of the slip ring assembly. On the outer surface of the male portion 42 of the slip ring assembly there is provided a plurality of electrically conductive members which ultimately provide electrical communication between the conductors 56 and the associated electronic circuitry and recording unit within the container 32. The conductors 56 pass through a conduit 58. As indicated in FIG. 2a, the bottom end cap 24 has at its lower extremity an internal thread adapted to receive the externally threaded conduit 58. Also, as shown, the conduit 58 has, at its connection with the end cap 24, an annular groove in which there is located another O-ring 60 which also serves to prevent the entry of drilling mud into the slip ring assembly and recorder capsule 16. Since conduit 58 is externally threaded and the end cap 24 is internally threaded there is provided thereby a rigid, non-rotative connection between conduit 58 and the recorder capsule 16.

Referring now to FIG. 2b, the conduit 58 enters the end cap 62 of another capsule 64, which capsule is denominated as the transducer signal processing capsule. Conduit 58, entering and communicating with the capsule 64 through the end cap 62, is not threadably connected thereto. As shown in FIG. 2b, the conduit 58 is provided with a plurality of annular recesses in which there is located the three O-rings 66. Although conduit 58 is threadably connected to the end cap 24 of the recorder capsule 16 it is coupled in a quick disconnect fashion (i.e., not rigidly coupled, not threadably coupled) to the end cap 62 of the transducer signal processing capsule 64. Advantageously, the transducer signal processing capsule 64 may be quickly disconnected from the conduit 58 in order that a different transducer signal processing capsule similar to capsule 64 may be quickly coupled to the conduit 58 and electrically coupled to the same recording unit and associated circuitry contained in the container 32.

The transducer signal processing capsule 64 is comprised of a tubular member 68 which is internally threaded as shown in FIG. 2b at its upper end and lower end so as to receive the end cap 62 as well as the end cap 70. The end caps 62 and 70 are provided with a plurality (two as shown in FIG. 2b) of annular recesses which are adapted to receive the O-rings 72. The O-rings 72 perform the same function as the O-rings 26, hereinbefore discussed. The transducer signal processing capsule 64 is situated coaxially within a special sub 74 which is similar to the special sub 18 hereinbefore described. As indicated in FIGS. 2a and 2b, the special, or additional, subs 18 and 74 are threadably coupled together by means of standard API threads. The tubular member 68 is coaxially supported within the special sub 74 by three welded longitudinal members 76 or runners in the same manner as the runners 28 support the tubular member 20 within the special sub 18, i.e., tubular member 68 is supported by longitudinal welds running the length of the runners 76 along the tubular member 68. The welds 78, which are formed in the same manner as the welds 30 are formed in relation to the special sub 18, support runners 76 on sub 74. Holes are machined through the special sub 74 and then the welds 78 are made to the various runners 76 in order to secure the runners to the special sub 74. As is the case with the recorder capsule 16 and the runners 28 supporting the tubular member 20 to the special sub 18, the tubular member 68 of the transducer signal processing capsule 64 is supported along substantially its entire length to the runners 76 and to special sub 74. As shown in FIG. 2b there is situated within the tubular member 68 of the capsule 64 a tubular container 80 or housing in which there is situated circuitry for processing transducer signals, which signals are ultimately transmitted to the recorder capsule 16. As shown in FIG. 2b there is situated immediately below the container 80 a disc of dielectric material 82 on which there is mounted a plurality of electrical terminals 84. Electrical conductors 86 are connected to these terminals 84 and are ultimately coupled to the transducer signal processing circuitry in the container 80.

Situated within and at the uppermost end of the transducer signal processing capsule 64 there is located another slip ring assembly comprising a male slip ring portion 88 and a female slip ring portion 90. The male slip ring portion 88 has a hollow interior including, inter alia, wires therein which are received in the communication conduit 58 and carried through ultimately to the recorder capsule 16. The male slip ring portion 88 is an extension of the conduit 58; the male slip ring portion 88 being fitted to the lowermost end of the conduit 58, as shown. Situated below a female slip ring portion 90 of said slip ring assembly is a header 92 in cylindrical form which houses the electrical terminals 94. These terminals 94 receive the electrical transducer signals from conductors 96 and transmit them via slip ring portions 90 and 88 to conductor 56 and, ultimately, to recorder capsule 16.

The end cap 70 rigidly mounts the instrument case 80 or housing to the capsule by being attached to the end cap 70 by screws. The header 92 serves a number of purposes: first, it aids in guiding the housing 80 into the end cap 62 during makeup of the instrument and supports the instrument after makeup; second, it supports the female slip ring assembly 90; and third, it provides a bulkhead seal for the instrument compartment. Container 80 is mechanically attached with screws to the end cap 70. The members 50, 92 and 82 serve as bulkheads and these bulkheads serve to protect the instrument container should O-rings on the conduits fail.

The conductors 96 transmit electrical signals from the container 80 containing the tranducer signal processing circuitry to the female portion 90 of the slip ring assembly and thence through the male portion 88 of the assembly the conductors 56 contained within the conduit 58, and, then, ultimately to the recorder capsule 16 containing the recording unit and its associated circuitry. Communication between the female slip ring portion 90 and the male slip ring portion 88 is accomplished by electrical contacts 98 extending from the female slip ring portion 90 to the male slip ring portion 88.

The lower end cap 70 shown in FIG. 2b has an aperture therein which is internally threaded as indicated to receive the externally threaded portion of a conduit 100. In order to prevent the drilling mud, or drilling fluid, from entering and contaminating the capsule 64 the conduit 100 is provided with two annular recesses, as shown, which contain the O-rings 102; the O-rings 102 being for the purpose of preventing the entry of drilling mud from contaminating the capsule 64. The conduit 100 also carries therewithin the electrical conductors 86 which, as shown in FIG. 2b, are connected to terminals 84 carried by dielectric cylindrical member 82.

As shown in FIGS. 2b and 2c the special sub 74 is connected at one end to the special sub 18 (FIG. 2a) and at its lower end to another special sub 104. Special subs 74 and 104 are interconnected, as shown, with standard threaded API joints.

As shown in FIG. 2c the special sub 104 has the outside surface thereof provided with an annular cavity 106. The annular cavity 106 has mounted therein one or more transducers designated generally by the reference number 108. The transducer, or transducers, 108 have the conductors 86, as shown in FIGS. 2b and 2c, connected thereto and run through conduit 100 into the capsule 64. The transducer or transducers 108 may, for example be strain gages arranged for measuring weight on bit 12 as well as for measuring static and dynamic torque on the special sub 104 or bit 12. The arrangement of the transducer or transducers 108 may be of a bridge-type configuration which, appropriately placed on the wall of the cavity 106 of the special sub 104 provides signals proportional to the various parameters hereinbefore mentioned.

Referring again to FIG. 2c the special sub 104 has, as indicated at its uppermost and lowermost ends two annular recesses in which there is located the O-rings seals 110. Fitted over the outside surface of the special sub 104 is a cylindrical member 112 which covers the cavity 106 as well as the transducer 108 (or transducer configuration) located within the cavity 106. O-rings 110 serve to prevent the drilling fluid or mud from entering the cavity 106 and thereby damaging the transducers and other equipment located therein.

As shown in FIG. 2c, at the lowermost end of conduit 100 there is provided two annular recesses in which there is located the sealing O-rings 114. O-rings 114 prevent the entry of the drilling fluid or mud into the cavity 106 containing the transducers. As with the lowermost end of the conduit 58, shown in FIG. 2b, the lowermost end of conduit 100 is quickly disconnectable from the elements within the special sub 104.

Situated, as shown in FIG. 2c, at the bottom of conduit 100 is an electrical connector assembly comprising male and female portions 116 and 118, respectively. The electrical conductors 86 are carried via conduit 100 and connected to the female connector portion 118 from whence they are electrically connected to the male connector portion 116. From the male connector portion 116 the conductors 86 run, as shown, to the transducer configuration 108. The male and female connectors 116 and 118 are as shown in FIG. 2c situated within the cylindrical portion 120 of coaxially located spider like member, designated generally by the reference number 122, the member 122 being situated coaxially within the special sub 104. As shown in FIG. 2c, the spider like member 122 has a plurality of radially extending arms 124 which are rigidly connected to the wall of the special sub 104. In order to secure the radially extending arm 124 to the special sub 104 holes are drilled through the sub 104 and the arms 124 are welded by means of the welds 126 to the sub 104. As is indicated in FIG. 2c one of the welds 126 and radial arms 124 has a hole 126a drilled therethrough in order that the conductors 86 from the transducers 108 may communicate with the male connector 116; the hole 126a communicating with the annular cavity 106 located between the special sub 104 and cylindrical member 112. As shown, the lowermost end of the member 122 is internally threaded and, thus, is adapted to receive an externally threaded end cap 128. The cap 128 has therewithin, as shown, a cavity 130 which allows for some slack in the conductors 86. End cap 128 is provided with two annular recesses which contain O-rings 132. The O-rings 132 prevent the entry of drilling mud into the cavity 130 and, thus, protect the conductors 86 and mated connectors 116 and 118 and the transducers 108, inter alia, from being damaged by the drilling fluid or drilling mud.

After mounting the transducers 108 in cavity 106 in the external wall portion of the special sub 104 the outer cylindrical member 112 is slipped over the outside surface of the special sub 112 from the top in accordance with the orientation shown in FIG. 2c. As can be appreciated from FIG. 2c the lowermost end of the cylindrical number 112 abuts against an external land provided in the outside surface at the lower end of the sub 104. In order, however, to secure cylindrical member 112 to the outer surface of the sub there is provided the split annular ring 134. With an appropriate tool the split ring 134 may be expanded and then slipped over the outside surface of the special sub 104 and then brought to rest on the utmost surface of the cylindrical member 112 and the ring 134 when contracted will be received in the indicated recess provided, as shown in FIG. 2c, thereby securing the cylindrical member 112 to the sub 104; the member 112 bearing against the O-rings 110 as shown.

The transducer 108 or transducer elements may be arranged in bridge fashion against the inside wall of the sub 104 within the cavity 106 to measure forces on the sub 104, which are proportional to various parameters associated with the drill bit or drill string.

As shown in FIG. 2c drilling fluid 136 emanates from the lowermost portion of the drill bit 12 through apertures provided in the drill bit 12, and upon exiting into the borehole returns upwardly between the surface of the borehole 14 and the outside surface of the drill string 10.

Although there has been described hereinbefore, and illustrated in the accompanying drawing figures, a system for logging while drilling in which the recordation of the various parameters is done within the drill string, in situ, in the borehole it is apparent that the apparatus of the invention can be quite easily adapted for use wherein the recorded information may be retrieved by means of a logging cable such as for example in accordance with the method and apparatus disclosed in U.S. Patent 3,209,323 issued Sept. 28, 1965, to G. J. Grossman, Jr.

While there has been illustrated in the drawings and described herein one more or less specific embodiment of the invention it is to be understood that this has been done for purposes of illustration and that the scope of the invention is not to be limited thereby but is to be determined from the appended claim.

What is claimed is:

1. Apparatus, for logging various parameters in an earth borehole as the borehole is being drilled, comprising:
   a drill string having a lower end thereof;
   first, second and third elongated hollow subs, each of the subs having an upper and lower end, the upper end of the first sub being coupled to the lower end of the drill string, the upper end of the second sub being coupled to the lower end of the first sub and the upper end of the third sub being coupled to the lower end of the second sub;
   a drill bit coupled to the lower end of the third sub;
   first and second elongated capsules, said first capsule containing logging equipment including a recording unit and associated circuitry, said second capsule containing logging equipment including transducer signals processing circuitry, said first capsule being located coaxially within the first sub, said second capsule being located coaxially within the second sub;
   a first plurality of longitudinal members, each of which is welded longitudinally along an outside surface of the first capsule and to the first sub whereby the first capsule is supported along substantially its entire length within the first sub;
   a second plurality of longitudinal members, each of which is welded longitudinally along an outside surface of the second capsule and to the second sub whereby the second capsule is supported along substantially its entire length within the second sub;
   a conduit for providing communication between the first and second capsules and the logging equipment contained in said capsules, said conduit having an end thereof which is externally threaded and an opposite end which is threadless, said first capsule having an internally threaded aperture therethrough which receives the externally threaded end of the conduit thereby providing a rigid connection between the conduit and first capsule, said second capsule having threadless aperture therethrough which receives the threadless end of the conduit thereby providing a longitudinally non-rigid friction fit connection between the conduit and second capsule;
   transducer means mounted on the third sub for detecting at least one parameter in the borehole and providing a signal representative of said parameters; and
   means for translating said signal to the second capsule.

References Cited
UNITED STATES PATENTS

| | | | |
|---|---|---|---|
| 2,000,716 | 5/1935 | Polk | 340—18 |
| 2,238,991 | 4/1941 | Cloud | 340—18 |
| 3,090,031 | 5/1963 | Lord | 340—18 |
| 3,103,643 | 9/1963 | Kalbfell | 340—18 |
| 3,186,222 | 6/1965 | Martin | 340—18 |
| 3,209,323 | 9/1965 | Grossman | 340—18 |

RICHARD A. FARLEY, Primary Examiner

D. C. KAUFMAN, Assistant Examiner